July 25, 1944.  J. L. MAYER  2,354,327
MANOMETER
Filed Feb. 17, 1941
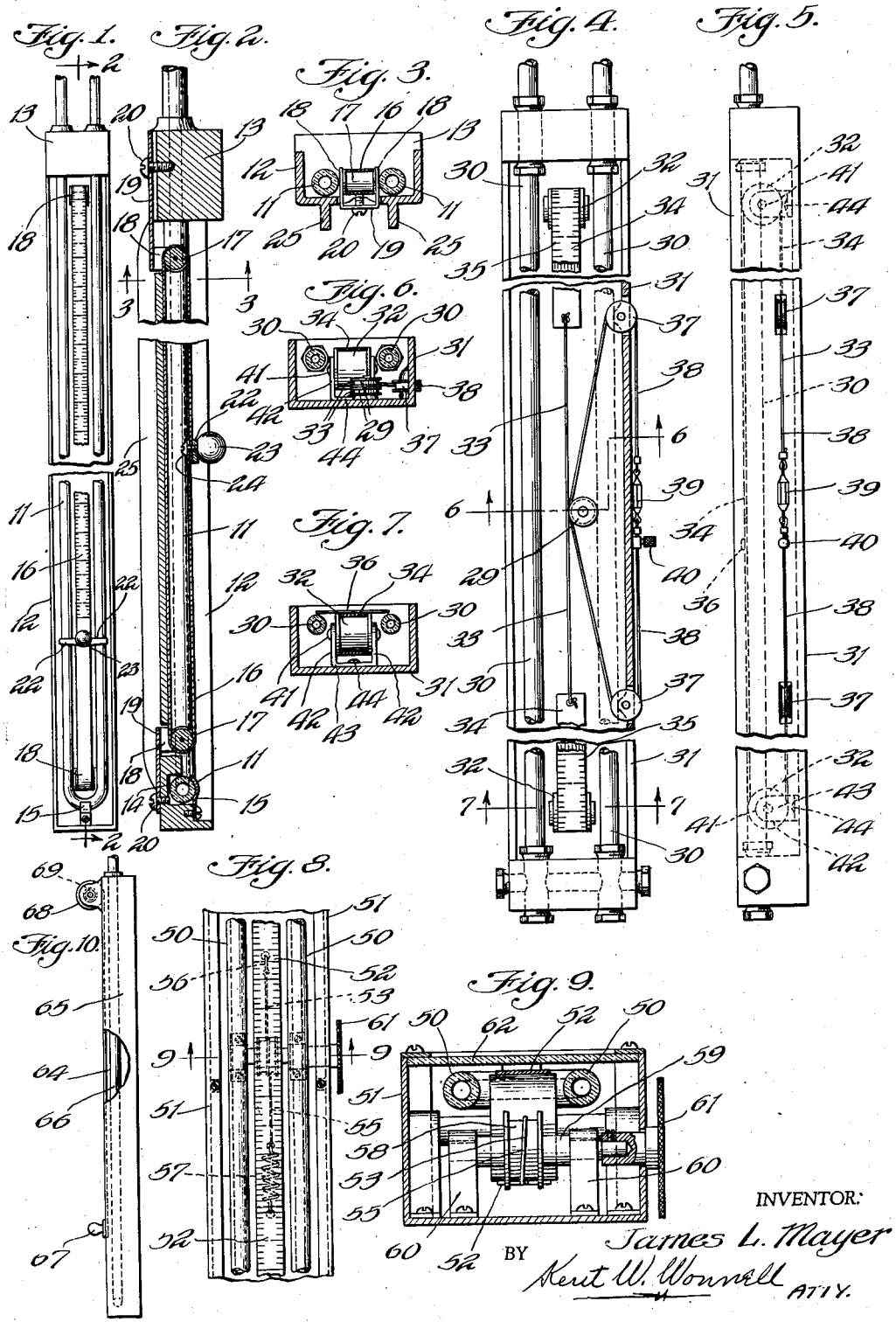
INVENTOR:
James L. Mayer
BY
Kent W. Wonnell
ATTY.

Patented July 25, 1944

2,354,327

UNITED STATES PATENT OFFICE 2,354,327

MANOMETER

James L. Mayer, Chicago, Ill.

Application February 17, 1941, Serial No. 379,308

11 Claims. (Cl. 73—31)

This invention relates in general to U-tube or parallel tube manometers and more particularly to a movable scale therefor which is adjustable for more accurate setting and determination of the pressure indication.

An important object of the invention is in the provision of a flexible tape with proper graduations which may be readily adjusted for equalized and differential readings in the two arms of a manometer.

A further object of the invention is in the provision of improved means for moving and adjusting the position of a flexible tape in a manometer.

A still further object of the invention is in the provision of improved means for accurately reading and determining the liquid level in either one or both of the tubes of a manometer in determining the zero or differential pressure in the tubes.

Other objects of the invention will appear in the specification and will be apparent from the drawing in which Fig. 1 is a front elevation of a manometer to which one form of this invention is applied;

Fig. 2 is a sectional view taken on the line 2—2 of Fig. 1;

Fig. 3 is a cross section taken on the line 3—3 of Fig. 2;

Fig. 4 is a front elevation of a manometer having a movable scale adjusted by indirect movement of cords and pulleys;

Fig. 5 is a side elevation thereof taken along one side of Fig. 4;

Fig. 6 is a sectional view taken on the line 6—6 of Fig. 4;

Fig. 7 is a sectional view taken on the line 7—7 of Fig. 4;

Fig. 8 shows a fragmentary front elevation of a modification in which a manometer scale is adjusted by a pulley with a hand-wheel located at one side of the tube;

Fig. 9 is a longitudinal section taken on the line 9—9 of Fig. 8;

Fig. 10 shows a modification with a curtain roller at the top.

Provision has heretofore been made for adjusting a rigid scale either for a short variation by means of set screws and slots in the scale through which the said screws extend, or by moving the rigid scale to project out of the normal case of the manometer. The present invention overcomes these objections by providing a flexible steel tape, mounted in the case to wind or roll upon mounted pulleys with means for directly or indirectly moving the tape and setting it in different positions for accurately reading the equalized or differential pressures indicated by the fluid levels in the adjacent tubes.

Referring now more particularly to the drawing, a simple form of U tube 11 is shown in Fig. 1 preferably made of glass or other transparent material, mounted in a supporting casing 12, open at the front thereof. The upper ends of the tubes extend into a header 13, and the lower end is held seated in a recess 14 by means of a fastening clip 15.

A flexible tape 16 is mounted at the upper and lower ends of the casing upon rollers 17 pivoted in ears 18 extending through openings in the casing from a holder 19 secured to the back of the casing by fastening screws 20.

The front side of tape is located substantially flush with the outer sides of the U tube and is provided with graduations above and below a zero or reference line indicated by the upper edge of the pointers 22, extending oppositely from the scale. A knob 23 is also preferably provided at this location for finger-hold engagement by means of which the tape may be directly moved up or down on its pulleys 17 to position the pointers at any desired location, to indicate the zero or equalized position of liquid in the tubes and being raised or lowered to indicate the position and distance which the liquid rises or falls in dfferent arms of the U tube.

In this form of the invention, the ends of the tape may be connected together so that it is continuous, the junction being below the knob 23 and the ends of the tape being secured together by inserting a threaded screw 24 through perforations (not shown) in the ends of the tape and securing them and the pointers 22 together and to the knob 23. When this instrument is made for long U tubes, the casing is preferably made of thin cast metal with rear strengthening ribs 25 spaced apart.

In the form of the invention shown by Figs. 4 to 7, the manometer or a pair of tubes 30 are mounted in parallel relation longitudinally in a casing 31, and rollers or pulleys 32 are mounted upon transverse cross-shafts adjacent the ends of the casing. A tape 34 extends over the upper and lower pulleys with graduations 35 at the front between the tubes, and with a pointer 36 affixed to the tape and extending over one or both of the tubes so that the level of the liquid may be accurately referred thereto.

At the back of the casing, the ends of the tape terminate at a distance from each other, but are connected for movement together so that the front tape may be easily adjusted and set in any desired position. This connection consists of a wire, cord or cable 33, the extremities of which are fastened to the ends of the tape 34, extending oppositely over guide roller 29 in line with the ends of the tape and over rollers or pulleys 37 spaced apart at one side of the casing so that the intermediate portion 38 of the cable between these rollers is at the outer sides of the casing.

To maintain the cable at the proper tension, a turn buckle 39 may be interposed in this portion of the cable for convenient access thereto, and an operating knob 40 is attached to the turn buckle or to the cable to provide convenient means for moving the cable between the limits of the pulleys 37. Since the wire connections are crossed at the back over roller 29, the movement of the knob 40 at the side produces a corresponding movement of the tape within the casing which with the pointer 36, may therefore be adjusted and set at any desired location.

In mounting the tape in this and other forms of the invention, each roller 32, and its crossshafts 41 may be supported in opposite arms 42 of a yoke 43 with the intermediate portion of the yoke swiveling on a bearing pin 44, attached to the back of the casing. With this mounting at each end of the tape, it is self-aligning and self-centering and even though the edges of the flexible metal tape tend to curl up or away from the rollers, the tape is easily maintained in proper position and aligned between the tubes.

In the modification shown in Figs. 8 and 9, parallel tubes, or a U tube 50 is mounted in a casing 51, with a tape 52 extending over end pulleys and between the legs of the U tube, as in the other forms, the ends of the tape terminating at a distance apart at the rear.

An operating wire or cable 53 is connected directly to the ends of the tape by a link 56 at one end and by a spiral spring 57 at the other end. Intermediate the ends of the cable, one or more turns are taken about a pulley 58, keyed to a cross-shaft 59 in brackets 60. One end of the shaft 59 projects beyond the side of the bracket 60 and a hand-wheel 61 is secured to the shaft and projects from the outer side of the casing where it is freely accessible for rotation. The rotation of this hand-wheel in either direction causes the corresponding movement of the tape which is visible from the front of the casing, and the tape may thus be accurately adjusted and set in any desired position.

In this and the previous form of the casing, the tape and the tubes may be protected by a glass 62 in front of them, since the adjusting means projects at the side of the casing.

In the form shown by Fig. 10, a tape 64 is suitably mounted to slide at the front of a casing 65 between arms of a U-tube 66, and has a knob 67 at one end for moving it. The other end is coiled upon a winding drum 68 at the top which has a spring 69 for rewinding the tape, like a spring curtain roller. The tape is drawn down by moving the knob and returned by the spring.

These various forms thus provide means for applying a flexible tape with graduations to the legs of a manometer, or to parallel tubes, so that the tape may be relatively adjusted and set in any position with respect thereto, without moving the tape to the outside of the casing and without requiring the manual adjustment of a fixed scale by means of tools for each desired variation or setting of the scale. An accurate reading, setting of the tape, and measurement of the difference in fluid level in the tubes is thus effected in a simple manner and in the least possible time without disturbing the instrument or the height of the liquid therein. This improvement may be applied to small or large instruments for using different liquids and instruments for different purposes without departing from the spirit and scope of this invention.

I claim:

1. The combination with a manometer having parallel legs, of a single flat flexible scale disposed between the legs, means comprising rollers at the ends of the tubes for mounting the scale thereon for longitudinal adjustment, and operating means connecting the ends of the scale to form an endless belt on the rollers and including means to operate the tape for longitudinal adjustment.

2. The combination with a pair of parallel manometer tubes containing indicating columns, of a flat, flexible, graduated scale between the tubes, means comprising rollers at the ends of the tubes about which the scale is movable for longitudinal adjustment, and operating means connecting the ends of the scale like a belt and including means extending at the rear of the tubes with an extension to one side of the tubes for moving the scale in both directions.

3. The combination with a pair of parallel manometer tubes containing indicating columns, of a flexible graduated scale having pointers extending therefrom to overlap the tubes, rollers at the top and bottom between the tubes upon which the scale is mounted, the extremities of the scale extending at the rear of the tubes, and means connected to the extremities of the scale having a portion extending to one side of the tubes to be engaged for moving the scale to set the pointers at a desired location along the tubes.

4. In a manometer having parallel tubes, a flexible tape having graduations on one side thereof positioned between the tubes, rollers at the ends of the tubes upon which the tape is mounted for endwise adjusting movement, and means for engaging the ends of the tape for holding it tightly on the rollers like a belt with an extension to one side of the parallel tubes engageable for moving the graduations of the tape with respect to the tubes.

5. In a manometer, a pair of parallel tubes containing liquid indicating columns, a flexible graduated tape mounted upon rollers between the tubes, and means for engaging the ends of the tape for holding it like an endless belt on the rollers, said means including an extension leading to one side of the parallel tubes and engageable for moving the tape to adjust and position the graduations of the tape with respect to the height of liquid in the tubes.

6. A structure, in accordance with claim 4, in which the mounting for the tapes comprises a swivel support for the roller at each end over which the tape passes, the roller being mounted transversely in the ends of a yoke which is pivoted upon an axis at right angles thereto so that the tape mounted is self-centering and self-aligning.

7. In a manometer having parallel tubes, a graduated flexible tape and rollers at the ends of the tubes for mounting the tape to move thereon with respect to the tubes, an enclosing casing therefor, the ends of the tape having a connecting cable with a part extending outside the casing providing an exposed portion at one side of the tubes, and a projecting knob on the exposed portion for manually moving the tape on the rollers to set the graduations thereof with respect to the tubes.

8. In a manometer having parallel tubes, a graduated flexible tape between the tubes, self-aligning rollers upon which the tape is mounted at the ends between the tubes, means for engaging and connecting the ends of the tape so that it is substantially continuous and including means for holding the tape tightly in position on the rollers, and operating means engaging the connecting means of the tape and projecting therefrom at one side of the tubes for moving the graduated portion of the tape with respect to the tubes.

9. In a manometer having parallel tubes, a flexible tape disposed between the tubes and having graduations relating thereto, rollers upon which the tape is mounted at the ends between the tubes, a connecting cable attached to the extremities of the tape with an endwise movable portion extending at one side of the parallel tubes, and means attached to the extending portion of the cable for moving it endwise and also for moving the graduated portion of the tape with respect to the tubes.

10. A structure in accordance with claim 8 in which the engaging and connecting means is wound about an operating drum intermediate the ends of the tubes, and the operating means comprises a hand-wheel projecting laterally at one side of the tubes for rotating the drum and thereby adjusting the position of the graduated tape with respect to the tubes.

11. A manometer structure in accordance with claim 8 in which the engaging and connecting means is crossed between the extremities of the tape, means at the side of the parallel tubes over which the intermediate portion of the engaging and connecting means passes to project a portion thereof at this side of the tubes, and a finger-engaging portion attached to the projecting portion of the engaging and connecting means at the side of the tubes for manually adjusting the position of the tape with respect to the tubes.

JAMES L. MAYER.